United States Patent
Izu et al.

(10) Patent No.: US 9,139,745 B2
(45) Date of Patent: Sep. 22, 2015

(54) AGGREGATE OF SPHERICAL CORE-SHELL CERIUM OXIDE/POLYMER HYBRID NANOPARTICLES AND METHOD FOR PRODUCING THE SAME

(75) Inventors: Noriya Izu, Aichi (JP); Toshio Uchida, Aichi (JP); Ichiro Matsubara, Aichi (JP); Toshio Itoh, Aichi (JP); Woosuck Shin, Aichi (JP); Maiko Nishibori, Aichi (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 584 days.

(21) Appl. No.: 13/389,140

(22) PCT Filed: Jul. 23, 2010

(86) PCT No.: PCT/JP2010/062430
§ 371 (c)(1),
(2), (4) Date: Feb. 6, 2012

(87) PCT Pub. No.: WO2011/018939
PCT Pub. Date: Feb. 17, 2011

(65) Prior Publication Data
US 2012/0142808 A1    Jun. 7, 2012

(51) Int. Cl.
*C08K 3/22* (2006.01)
*B82Y 30/00* (2011.01)
(Continued)

(52) U.S. Cl.
CPC ............... *C09D 11/10* (2013.01); *B82Y 30/00* (2013.01); *C01F 17/0043* (2013.01);
(Continued)

(58) Field of Classification Search
CPC .......... B82Y 30/00; G02B 1/043; G02B 5/23; B22F 1/0062; C09D 11/40; C09K 8/805; F21V 33/0052; F21V 5/002; G02F 1/133305
USPC .......... 428/172, 141, 407, 323, 327; 522/111, 522/90; 524/403; 977/773, 901
See application file for complete search history.

(56) References Cited

U.S. PATENT DOCUMENTS

2003/0175502 A1* 9/2003 Obayashi et al. ............. 428/327
2005/0065026 A1   3/2005 Okubo
(Continued)

FOREIGN PATENT DOCUMENTS

| CN | 101389981 A | 3/2009 |
| JP | 10-230558 A | 9/1998 |

(Continued)

OTHER PUBLICATIONS

International Search Report received in PCT/JP2010/062430, mailed Sep. 7, 2010.
(Continued)

*Primary Examiner* — James J Seidleck
*Assistant Examiner* — S. Camilla Pourbohloul
(74) *Attorney, Agent, or Firm* — Suzannah K. Sundby, Esq.; Canady + Lortz LLP

(57) ABSTRACT

The present invention provides an aggregate of spherical core-shell cerium oxide/polymer hybrid nanoparticles, a process for producing the same, and a product such as an antireflection film having a high refractive index layer. The present invention relates to an aggregate of spherical core-shell cerium oxide/polymer hybrid nanoparticles in which the core and shell are cerium oxide and a polymer, respectively, and the aggregate is highly concentrated, with a volume fraction of the spherical core-shell cerium oxide/polymer hybrid nanoparticles being at least 32% or higher, the aggregate contains a fixing agent, the aggregate is configured such that the fixing agent fills in voids between the spherical core-shell cerium oxide/polymer hybrid nanoparticles, the aggregate has a uniform distribution of the core-shell cerium oxide/polymer hybrid nanoparticles, which are spherical secondary particles synthesized by the polyol method, and the aggregate has excellent mechanical strength, light transmittance, and UV light-blocking properties; and the present invention further relates a process for producing the same; and an antireflection film and ink having the same.

9 Claims, 4 Drawing Sheets

(51) Int. Cl.
  *C09D 11/10*  (2014.01)
  *C01F 17/00*  (2006.01)
  *C09D 11/037*  (2014.01)

(52) U.S. Cl.
  CPC .......... *C09D 11/037* (2013.01); *C01P 2004/03* (2013.01); *C01P 2004/32* (2013.01); *C01P 2004/64* (2013.01); *C01P 2004/84* (2013.01)

(56) References Cited

U.S. PATENT DOCUMENTS

| | | | |
|---|---|---|---|
| 2009/0002821 A1 | 1/2009 | Okano et al. | |
| 2009/0142502 A1* | 6/2009 | Lines et al. | 427/385.5 |
| 2010/0015188 A1 | 1/2010 | Izu et al. | |
| 2010/0143702 A1* | 6/2010 | Im et al. | 428/327 |
| 2010/0209710 A1 | 8/2010 | Izu et al. | |

FOREIGN PATENT DOCUMENTS

| | | |
|---|---|---|
| JP | 2003-41152 A | 2/2003 |
| JP | 2004-035632 | 2/2004 |
| JP | 2005-97612 A | 4/2005 |
| JP | 2008-24912 A | 2/2008 |
| JP | 2008-111114 A | 5/2008 |
| JP | 2008-115370 A | 5/2008 |

OTHER PUBLICATIONS

Shibata, S. (2006) "Assembly of Particles and Photonic Applications" Ceramincs 41: 334-335.
Krishna, M. G., et al. (1998) "Temperature and Ionic Size Dependence of the Properties of Ceria Based Optionic Thin Films" Materials Science and Engineering, 14-20.
Mogensen, M. (2000) "Physical, Chemical, and Electrochemical Properties of Pure and Doped Ceria" Solid State Ionics 129:63-94.
Izu, N. et al. (2008) "Controlled Synthesis of Monodispersed Cerium Oxide Nanoparticle Sols Applicable to Preparing Ordered Self-Assemblies" The Chemical Society of Japan 81(6):761-766.
Ho, C. et al. (2005) "Morphology-Controllable Synthesis of Mesoporous CeCo2 Nano—and Microstructures" Chem. Mater. 17:4514-4522.
Uekawa, N. et al. (2004) "Characterization of CeO2 Fine Particles Prepared by the Homogeneous Precipitation Method with a Mixed Solution of Ethylene Glycol and Polythylene Glycol" J. Mater. Res. 19(4): 1087-1092.
Chu, X. et al. (1993) "Sintering of Sol-Gel-Prepared Submicrometer Particles Studies by Transmission Electron Microscopy" J. Am. Ceram. Soc. 76(8): 2115-2118.
Hsu, W.P. et al. (1988) "Preparation Properties of Monodispersed Colloidal Particles of Lanthanide Compounds. 2. Cerium(IV)" Langmuir, 4:31-37.
Noriya Izu, et al., Preparation of core-shell type cerium oxide/polymer hybrid nanoparticles for ink-jet printing, Journal of the Ceramic Society of Japan, 2009, 117 [6], pp. 769-772, Japan.

\* cited by examiner

AGGREGATE OF SPHERICAL CORE-SHELL CERIUM OXIDE/POLYMER HYBRID NANOPARTICLES AND METHOD FOR PRODUCING THE SAME

TECHNICAL FIELD

The present invention relates to an aggregate of spherical core-shell cerium oxide/polymer hybrid nanoparticles (hereafter, it can be described as "spherical CSCP nanoparticles") synthesized using the polyol method, and more specifically to an aggregate of spherical CSCP nanoparticles that is highly concentrated, with the volume fraction of spherical CSCP nanoparticles being 32% or more, that contains a fixing agent made from a resin, that has a uniform distribution of spherical CSCP nanoparticles, that has excellent mechanical strength, that can easily be fabricated into a film with a large surface area, and that has excellent optical transmittance and ultraviolet shielding properties; a process for producing the same; and the present invention further relates to a product such as an anti-reflection coating produced using the same. The present invention provides new technology and new products relating to spherical CSCP nanoparticle aggregates that are useful, for example, in photonic crystals, UV light-blocking textiles, and anti-reflection materials using a high refractive index film or high refractive index layer.

BACKGROUND ART

In recent years, photonic crystals created with fine particles have attracted considerable interest (Non-patent Document 1) because the light emission and transmittance thereof can be artificially controlled with fine particles. Fine particles for use in photonic crystals require the following properties: they must be spherical, have a particle size of about 50 nm to 200 nm, have a narrow particle size distribution (small standard deviation in particle size), have a high refractive index (n>2), and have good dispersibility in liquids. However, fine particles satisfying these conditions have not been developed until now.

Meanwhile, cerium oxide has a high refractive index of 2.1 and is a suitable material for photonic crystals (Non-patent Documents 2 and 3). Moreover, cerium oxide is well known for its UV light-blocking effects and, for example, a UV light-blocking agent using cerium oxide is disclosed in a prior art document (Patent Document 1). Textiles, etc., with UV light-blocking effects are needed because UV light is harmful to the human body, and cerium oxide shows promise for use in those kinds of textiles.

Spherical CSCP nanoparticles have recently been reported in prior art (Patent Document 2, Non-patent Document 4). The spherical CSCP nanoparticles in these reports are unlike others (Non-patent Documents 5 to 8) and have the following characteristics: (1) the shape of these nanoparticles is spherical, (2) the particle size distribution of the nanoparticles is narrow, (3) the nanoparticles comprise cerium oxide primary particles of 2 nm to 3 nm aggregated in spherical to form core-shell structures coated with an organic polymer, (4) even if the nanoparticles are dried, they can be very easily re-dispersed in an aqueous or nonaqueous solvent, (5) the nanoparticles can be dispersed in a liquid with a high particle concentration to prepare a dispersion thereof, (6) the mean particle size of the nanoparticles can be controlled while the particle size distribution remains narrow, e.g. within a range of 50 nm to 120 nm, by changing the molecular weight of the polymer that is added during fabrication, and (7) the particles can be synthesized easily with the polyol method.

These spherical CSCP nanoparticles show promise as colloidal crystals because they are spherical and have a narrow particle size distribution (as monodispersion). Moreover, it is expected that these spherical CSCP nanoparticles can be dispersed in a variety of resins because they are very easily re-dispersed in an aqueous or nonaqueous solvent. Furthermore, an aggregate of spherical CSCP nanoparticles is disclosed in one of the above prior art documents (Patent Document 2).

There is a problem, however, because the aggregate disclosed in the above prior art document (Patent Document 2) has no mechanical strength and is so friable that it will break if grasped with tweezers. Moreover, in that document the self-organized, nonuniform assemblages without any fixing agent of the nanoparticles are referred to as aggregates. Therefore, a film with a large surface area that uniformly contains spherical CSCP nanoparticles could not be produced with the technology disclosed in that document.

Furthermore, one prior art document (Patent Document 3) discloses a composite wherein a polymer is covalently bonded to the surface of fine inorganic oxide primary particles and a coating composition (resin) containing the same, but those are fundamentally different from spherical CSCP nanoparticles and an aggregate thereof. Based on their explanation, the fine inorganic oxide particles disclosed in Patent Document 3 are understood to be primary particles. In contrast, spherical CSCP nanoparticles comprise spherical secondary particles into which primary particles gathered, so the two are entirely different. Moreover, because the shape of the fine inorganic oxide particles in Patent Document 3 is described as random, the shapes of the two differs as well.

In general, it is rare for fine inorganic oxide primary particles to be spherical. This is because primary particles are crystals, so crystal planes are often present on the surfaces thereof. Primary particles of a random shape often agglomerate, and secondary particles formed therefrom have a shape similar to a cluster of grapes. Therefore, because a polymer is covalently bonded to the surfaces of the grape cluster-shaped secondary particles in Patent Document 3, each particle will have a different shape. As a result, such secondary particles cannot be dispersed at a high density in a resin.

Quite recently the inventors attempted to fix the above spherical CSCP nanoparticles in a photosetting resin (photosensitive resin), but they encountered a problem because the spherical CSCP nanoparticles aggregated in self-organized, nonuniform agglomerations, and parts that only contained resin appeared, so the inventors were not able to obtain a uniform aggregate. Moreover, when ethanol, propylene glycol monomethyl ether, or ethylene glycol monobutyl ether was used as the solvent, problems with light transmittance, nonuniformity, etc., occurred. Therefore, there is a strong demand in this field for the development of a spherical CSCP nanoparticle aggregate having a uniform distribution of spherical CSCP nanoparticles and excellent mechanical strength, the technology for producing the same, and products using the same.

Patent Document 1: Japanese Patent Application Laid-open No. 2004-35632
Patent Document 2: Japanese Patent Application Laid-open No. 2008-115370
Patent Document 3: Japanese Patent Application Laid-open No. 2003-041152
Non-patent Document 1: Shuichi Shibata, Ceramics 41 (2006) 334
Non-patent Document 2: M. G. Krishna, A. Hartridge, A. K. Bhattacharya, Materials Science and Engineering B55 (1998) 14

Non-patent Document 3: M. Mogensen, N. M. Sammes, G. A. Tompsett, Solid State Ionics 129 (2000) 63

Non-patent Document 4: N. Izu, I. Matsubara, T. Itoh, W. Shin, M. Nishibori, Bulletin of the Chemical Society of Japan 81 (2008) 761-766

Non-patent Document 5: C. Ho, J. C. Yu, T. Kwong, A. C. Mak, S. Lai, Chem. Mater., 17 (2005) 4514

Non-patent Document 6: N. Uekawa, M. Ueta, Y. J. Wu, K. Kakegawa, J. Mater. Res., 19 (2004) 1087

Non-patent Document 7: X. Chu, W. Chung, L. D. Scmidt, J. Am. Ceram. Soc., 76 (1993) 2115

Non-patent Document 8: W. P. Hsu, L. Ronnquist, E. Matijevic, Langmuir 4 (1988) 31

Given these circumstances, while giving due consideration to the prior art, the inventors performed intensive research with the aim of producing a new aggregate of spherical CSCP nanoparticles that comprises an aggregate body formed by uniformly distributed, aggregated CSCP nanoparticles synthesized by the polyol method, that has excellent mechanical strength, that can increase surface area, and that has excellent transparency. As a result, by using a special solvent and fixing agent the inventors succeeded in producing a spherical CSCP nanoparticle aggregate that is highly concentrated with the volume fraction of spherical CSCP nanoparticles being 32% or more, that has a uniform distribution of spherical CSCP nanoparticles, and that has excellent mechanical strength, thus completing the present invention. An object of the present invention is to provide an aggregate of spherical CSCP nanoparticles that has excellent mechanical strength, that can increase surface area, and that can form a transparent film at low cost; and a process for producing the same. A further object of the present invention is to provide an anti-reflection material containing a high refractive index layer formed by using such an aggregate of spherical CSCP nanoparticles.

The present invention comprises the following technical means for solving the above problems.

(1) An aggregate of spherical core-shell cerium oxide/polymer hybrid nanoparticles,
the aggragate having uniformly distributed and aggregated spherical core-shell cerium oxide/polymer hybrid nanoparticles having a spherical secondary particle formed by assembled cerium oxide primary particles serving as the core and a polymer serving as the shell, wherein 1) the aggregate is highly concentrated, with a volume fraction of the spherical core-shell cerium oxide/polymer hybrid nanoparticles being at least 32%, 2) the aggregate contains a fixing agent made from a resin, 3) the aggregate is configured such that the fixing agent fills in voids between the spherical core-shell cerium oxide/polymer hybrid nanoparticles, 4) the aggregate has a uniform distribution of the spherical core-shell cerium oxide/polymer hybrid nanoparticles, and 5) the aggregate has mechanical strength.

(2) The aggregate of spherical core-shell cerium oxide/polymer hybrid nanoparticles according to (1) above, wherein the above fixing agent is a photosetting resin or a thermosetting resin that has been cured by irradiation with light or application of heat.

(3) The aggregate of spherical core-shell oxide/polymer hybrid nanoparticles according to (1) above, wherein no silane coupling agent or surfactant is present on a surface of the core of the spherical core-shell cerium oxide/polymer hybrid nanoparticles.

(4) The aggregate of spherical core-shell cerium oxide/polymer hybrid nanoparticles according to (1) above, wherein the aggregate has a film-like structure formed as a coating on a substrate or base material.

(5) The aggregate of spherical core-shell cerium oxide/polymer hybrid nanoparticles according to (1) above, wherein a refractive index thereof is no lower than 1.65.

(6) The aggregate of spherical core-shell cerium oxide/polymer hybrid nanoparticles according to (1) above, wherein a haze thereof is no higher than 2%.

(7) An anti-reflection film characterized by comprising an aggregate of spherical core-shell cerium oxide/polymer hybrid nanoparticles defined in (1) above.

(8) An ink for fabricating an aggregate of spherical core-shell cerium oxide/polymer hybrid nanoparticles defined in (1) above, wherein the ink is formed from spherical core-shell cerium oxide/polymer hybrid nanoparticles, a photosetting resin, and a solvent.

(9) A process for producing an aggregate of spherical core-shell cerium oxide/polymer hybrid nanoparticles defined in (1) above, wherein the process comprising: a step of preparing an ink formed from core-shell cerium oxide/polymer hybrid nanoparticles, a photosetting resin or a thermosetting resin, and a solvent; a step of forming the ink into a compact; and a step of curing the resulting compact by irradiation with light or application of heat.

(10) The process for producing the aggregate of spherical core-shell cerium oxide/polymer hybrid nanoparticles according to (9) above, wherein the solvent is methyl ethyl ketone, methyl isobutyl ketone, methyl lactate, ethyl lactate, or butyl lactate.

DISCLOSURE OF THE INVENTION

Next the present invention will be described in further detail.

The present invention involves an aggregate, the aggregate comprising uniformly distributed and aggregated spherical core-shell cerium oxide/polymer hybrid nanoparticles having cerium oxide serving as the core and a polymer serving as the shell, wherein the aggregate is highly concentrated, with a volume fraction of the spherical core-shell cerium oxide/polymer hybrid nanoparticles being at least 32%, the aggregate contains a fixing agent comprising a resin, the aggregate is configured such that the fixing agent fills in the spaces between the spherical core-shell cerium oxide/polymer hybrid nanoparticles, the aggregate has a uniform distribution of spherical core-shell cerium oxide/polymer hybrid nanoparticles, and the aggregate has mechanical strength.

Moreover, the present invention involves an ink for fabricating the aggregate of spherical core-shell cerium oxide/polymer hybrid nanoparticles that comprises the spherical core-shell cerium oxide/polymer hybrid nanoparticles, a photosetting resin, and a solvent. Furthermore, the present invention involves a process for producing the aggregate of spherical core-shell cerium oxide/polymer hybrid nanoparticles that comprises the steps of: preparing an ink containing the spherical core-shell cerium oxide/polymer hybrid nanoparticles, a photosetting resin or a thermosetting resin, and a solvent; forming the ink into a compact; and curing the resulting compact by irradiation with light or application of heat.

In the present invention the term spherical CSCP nanoparticles refers to particles wherein the core is cerium oxide primary particles assembled into a spherical secondary particle and the shell is a polymer layer on the surface thereof. In this case the polymer molecules serving as the shell are crosslinked together. As a result, the shell will not separate from the core even when washed. These CSCP nanoparticles are a cerium oxide/polymer hybrid, where the term "hybrid" refers to a cerium oxide/polymer composite.

In this description, the designation of hybrid is omitted in some cases. The term "microparticles" is used in place of the term "nanoparticles" in some instances. Moreover, the term "polymer" in reference to the polymer molecules serving as the shell is sometimes omitted, in other words, there are references to "core shell cerium oxide particles." The word polymer molecules is also written as polimer in some instances.

The spherical CSCP nanoparticles used in the present invention have the following characteristics: (1) the shape of the nanoparticles is spherical, (2) the nanoparticles have a narrow particle size distribution, (3) the nanoparticles have a core-shell structure wherein 2 nm to 3 nm oxide primary particles assemble in the shape of a sphere and are coated with an organic polymer, (4) even after dried, the nanoparticles are very easily re-dispersed in an aqueous or nonaqueous solvent, (5) the nanoparticles can be used to prepare a liquid dispersion with a high particle concentration, (6) the mean particle size of the nanoparticles can be controlled within a range of 10 nm to 1000 nm by changing the molecular weight of the polymer that is added during fabrication while the particle size distribution remains narrow, and (7) the nanoparticles can be synthesized easily by the polyol method.

The terms "aggregate of spherical CSCP nanoparticles" and "spherical CSCP nanoparticle aggregate" in the present invention refer to a body comprising the above spherical CSCP nanoparticles that have aggregated in a state of uniform distribution. The shape of the aggregate is not specified, and examples include a thin film, a thick film, bulk product, a textile, etc. The term "fixing agent" in the present invention refers to a resin composition that fills in the spaces between the spherical CSCP nanoparticles to increase the mechanical strength of the spherical CSCP nanoparticle aggregate.

A photosetting resin, thermosetting resin, etc., that is cured by light or heat can be used for this fixing agent, but the fixing agent is not limited thereto. When a base material is present the term "mechanical strength" of the aggregate of spherical CSCP nanoparticles refers to the adhesion between the base material and the aggregate as well as to the resistance to destruction, etc., of the aggregate when the surface thereof is scraped with a metal rod, etc. Moreover, when a base material is not present, mechanical strength refers to the hardness of the aggregate and the resistance to breakage of the aggregate when a force is applied thereto.

In other words, when a base material is present the phrase "excellent mechanical strength" in the present invention refers to having enough strength such that the aggregate does not peel off the base material, and the aggregate is not destroyed even when the surface of the aggregate is scraped with a metal rod. Moreover, when a base material is not present the phrase refers having sufficient strength to resist breakage when grasped by tweezers, etc. The term "photosetting resin" refers to a resin that cures when irradiated with light (ultraviolet or visible, etc.), and the term "thermosetting resin" refers to a resin that cures when heat is applied thereto.

Next the aggregate of spherical CSCP nanoparticles and the process for producing the same will be described. First the polyol method for producing the spherical CSCP nanoparticles will be described below. The cerium salt, polymer, and a high-boiling point organic solvent serving as the starting materials are first mixed together. Herein the term "cerium salt" refers to a metal salt wherein the positive ion is a cerium ion, and examples thereof include cerium nitrate, cerium sulfate, cerium acetate, etc., preferably cerium nitrate. Most cerium salts are normally hydrates. Preferably the cerium salt concentration is $0.4$ kmol/m$^3$ or more because that improves the yield.

The term "polymer" refers to an organic polymer, and examples thereof include polyvinylpyrrolidone, hydroxypropyl cellulose, and hydroxypropyl methylcellulose, preferably polyvinylpyrrolidone. Preferably the polymer concentration is 80 kg/m$^3$ to 120 kg/m$^3$. Herein the term "polymer concentration" is defined as the weight of polymer added per unit volume of solvent.

The polymer concentration lies in the range of 80 kg/m$^3$ to 120 kg/m$^3$ because if it is too much lower, the cerium oxide particles agglomerate too easily and a core-shell form cannot be achieved. Moreover, if the polymer concentration is much higher than the above range, the cerium oxide nucleation reaction will not proceed.

The term "high boiling point solvent" refers to a solvent with a boiling point higher than 100° C., and examples include polyols such as ethylene glycol, diethylene glycol, glycerin, and propylene glycol, preferably ethylene glycol.

The above starting materials must be mixed enough to become fully homogenous. During this mixing step the temperature cannot be raised. If the temperature is too high, cerium oxide will form and nanoparticles of a uniform particle size cannot be obtained.

After the starting ingredients have been uniformly mixed, they are heated and refluxed at a given temperature of 110° C. or higher. This is the heating and reflux step. Preferably the temperature used during the mixing step is raised to this given temperature as quickly as possible.

The cerium oxide forms during this heating and reflux step. The cerium oxide primary particles are on the order of several nanometers in size and assemble to form a spherical secondary particle. This becomes the core. Simultaneously with the formation of the secondary particles, the polymer collects on the surface thereof and forms the shell. The polymer forming the shell contains both polymer with the same structure as the starting material polymer and polymer that is crosslinked together. A shell that is inseparable from the core is achieved in this manner.

The heating and reflux step is performed for a given amount of time, and then the solution is cooled. A liquid dispersion containing spherical CSCP nanoparticles is obtained thereby. Unreacted material may be contained in this liquid dispersion, so depending on the intended application, the unreacted materials must sometimes be removed by separation and washing.

Methods of separation and washing include, for example, a method wherein the nanoparticles are precipitated with a centrifuge, the supernatant is discarded, the nanoparticles are re-dispersed in a desired solvent, and the step of separating and removing the supernatant is repeated. Thus, to suit the application the spherical CSCP nanoparticles can be dispersed in a desired solvent to obtain a liquid dispersion of nanoparticles or they can be dried to obtain a powder of nanoparticles., etc.

To reduce the shell of the spherical CSCP nanoparticles, they can, for example, be dispersed in a solvent wherein the shell is soluble, and then separated and washed after the shell has dissolved to obtain spherical CSCP nanoparticles with a reduced shell.

Moreover, as a different method, heat can be applied to the spherical CSCP nanoparticles in air at a temperature of 150° C. or higher, or more preferably 200° C. or higher, to partially combust and thereby reduce the shell. The separation and washing step is performed as needed in this case. Spherical CSCP nanoparticles with reduced shells can be obtained in this manner. Hence, the polyol method is an extremely simple and low cost process in comparison with previously disclosed methods for imparting dispersibility to inorganic microparticles (e.g., Patent Document 3).

Next the spherical CSCP nanoparticles are mixed with a photosetting resin and a solvent, for example, to prepare an ink for producing an aggregate of spherical CSCP nanoparticles. Acrylate resins and epoxy resins can be noted as examples of photosetting resins. Preferably, the acrylate resin comprises a monomer with an acryloyl group, an oligomer, and a polymerization initiator.

Examples of a monomer with an acryloyl group and oligomer include monofunctional monomers such as isooctyl acrylate, 2-hydroxyethyl methacrylate, n-acryloyloxyethyl hexahydrophthalimide, and N,N-dimethylacrylamide; bifunctional monomers such as triethylene glycol diacrylate and 1,6-hexanediol diacrylate; and trifunctional or greater multifunctional monomers such as pentaerythritol triacrylate and dipentaerythritol hexaacrylate. Examples of an oligomer include urethane acrylate, epoxy acrylate, polyester acrylate, and polyether acrylate.

Examples of a polymerization initiator include diethoxyacetophenone, 2-hydroxy-2-methyl-1-phenyl propan-1-one, benzoin isobutyl ether, benzoin isopropyl ether, benzyl dimethyl ketal, 1-hydroxy cyclohexyl phenyl ketone, benzophenone, 2-chlorothioxanthone, and phenyl bis(2,4,6-trimethylbenzoyl) phosphine oxide.

In the present invention it was discovered that there are both suitable and unsuitable solvents for the spherical CSCP nanoparticles. Examples of a suitable solvent for the spherical CSCP nanoparticles include methyl ethyl ketone, methyl isobutyl ketone, methyl lactate, ethyl lactate, butyl lactate, etc. Moreover, examples of an unsuitable solvent for the spherical CSCP nanoparticles include ethanol, propylene glycol monomethyl ether, and ethylene glycol monobutyl ether, etc.

In general, when oxide particles are dispersed in a solvent, there is no solvent selectivity involved, and any desired solvent can be used. A photosetting resin, however, involves requires solvent selectivity. More specifically, when spherical CSCP nanoparticles are dispersed in a solvent as described below, not just any solvent can be used, and there are both suitable and unsuitable solvents for the spherical CSCP nanoparticles. This is one of the unique characteristics of spherical CSCP nanoparticles. In this case, the solvent not only affects the dispersibility of the spherical CSCP nanoparticles in the solvent, but also affects the aggregate after it has been fixed after the solvent has evaporated.

In addition to the monomer with an acryloyl group and the oligomer, and the polymerization initiator, a polymerization inhibitor, non-reactive polymer, or filler, or another type of additive can be added to the acrylate resin. A thermosetting resin can also be used in place of the photosetting resin. In this case, the spherical CSCP nanoparticles are mixed with a thermosetting resin and a solvent in order to prepare an ink for producing an aggregate of spherical CSCP nanoparticles.

The method for forming the aggregate of spherical CSCP nanoparticles is optional, and examples include screen printing, bar coating, spin coating, dip coating, etc., when the aggregate is formed on a base material. A loss of aggregate strength will occur if ethanol is used as a cleaning agent for cleaning the surface of the base material whereon the aggregate is formed.

It has been found that this kind of loss in strength occurs only when spherical CSCP nanoparticles are contained in the ink and does not occur when only the fixing agent including no spherical CSCP nanoparticles is contained, so this loss in strength is a characteristic phenomenon caused by the presence of the spherical CSCP nanoparticles. Therefore, ethanol cannot be used with spherical CSCP nanoparticles even for cleaning. Additionally, methods for forming the aggregate when a base material is not used include stereolithography, dispensing, etc.

As described above, the selection of the solvent is a key point when fixing the spherical CSCP nanoparticles with a fixing agent. An aggregate of spherical CSCP nanoparticles with the abovementioned characteristics, in other words, a high concentration of spherical CSCP nanoparticles at a volume fraction of 32% or higher, the inclusion of a fixing agent, a uniform distribution of the spherical CSCP nanoparticles, and excellent mechanical strength, cannot be produced with alcohol or alcohol-derived solvents such as ethanol, propylene glycol monomethyl ether, and ethylene glycol monobutyl ether.

As mentioned above this is a characteristic property of the spherical CSCP nanoparticles and has been revealed in the course of research and development by the inventors up to this point. Therefore, an aggregate of spherical CSCP nanoparticles having the above characteristics can be produced by using, for example, specific solvents such as methyl isobutyl ketone, methyl ethyl ketone, or a mixed solvent consisting primarily thereof.

After the aggregate of spherical CSCP nanoparticles is formed, if a photosetting resin is used, for example, the fixing agent is cured by irradiation with UV light or visible light. The spherical CSCP nanoparticles are fixed in the cured photosetting resin fixing agent thereby to impart mechanical strength. Moreover, when a thermosetting resin is used, for example, the fixing agent is cured by applying heat. The spherical CSCP nanoparticles are fixed in the cured thermosetting resin fixing agent thereby to impart mechanical strength.

Next the characteristics of the spherical CSCP nanoparticles listed above will be described, i.e., the high concentration of spherical CSCP nanoparticles at a volume fraction of 32% or higher, the inclusion of a fixing agent, the uniform distribution of the spherical CSCP nanoparticles, and the excellent mechanical strength. The term "volume fraction" of the spherical CSCP nanoparticles refers to the ratio by volume occupied by spherical CSCP nanoparticles in the aggregate thereof. In this case, if the volume fraction of spherical CSCP nanoparticles is assigned the value V (%), then 100−V (%) represents the volume fraction of constituents other than the spherical CSCP nanoparticles, and these include, for example, the cured photosetting resin, etc., voids, etc.

The volume fraction of spherical CSCP nanoparticles in the spherical CSCP aggregate of the present invention is 32% or higher. In general, it is expected that the mechanical strength will decline as the volume fraction of spherical CSCP nanoparticles increases because the ratio of the fixing agent comprising the cured photosetting resin, etc., decreases. However, the mechanical strength of the aggregate of spherical CSCP nanoparticles in the present invention remains excellent even with a high concentration of spherical CSCP nanoparticles at a volume fraction of 32% or higher.

The uniformity of the aggregate of spherical CSCP nanoparticles can be evaluated by observation with a scanning electron microscope as SEM. The term "uniformity" refers to the absence of variations in the concentration of spherical CSCP nanoparticles in the spherical CSCP nanoparticle aggregate. A typical example of non-uniformity would be an aggregate that could be divided into regions wherein spherical CSCP nanoparticles with a diameter of 10 μm are almost absent and regions wherein the spherical CSCP nanoparticles are present at a high density.

To be judged uniform in the present invention, the distribution of the spherical CSCP nanoparticles should appear uniform even at a magnification of 10,000× in the SEM. When the uniformity is poor, the mechanical strength also becomes poor and transparency declines.

There are a variety of methods for determining the refractive index, and the method for the measurement thereof is not limited herein. As a method for determining the refractive index of an aggregate formed on a substrate, there is, for example, a method that uses a spectroscopic ellipsometer (spectroscopic ellipsometry). In this method the surface of a sample is irradiated with light, and a method is used to determine the optical constants (refractive index, extinction coefficient) of the sample based on the change in polarization before and after reflection. The refractive index of the aggregate of spherical CSCP nanoparticles formed on a base material is preferably 1.65 or higher, and more preferably 1.70 or higher.

The term "turbidity" refers to an indicator of transparency, and it can be measured, for example, by the method described in JIS 7361. In the present invention the turbidity was examined with a haze meter (Nippon Denshoku Industries Co., Ltd., NDH 5000). The turbidity of the aggregate of spherical CSCP nanoparticles formed on a base material was 2% or lower (the turbidity of the aggregate was corrected by obtaining the turbidity of the base material alone and subtracting it from the turbidity value for the base material plus the aggregate).

As described above, when a base material is present an aggregate of spherical CSCP nanoparticles with "excellent mechanical strength" has enough strength such that the aggregate does not peel off the base material, and the aggregate is not destroyed even when the surface of the aggregate is scraped with a metal rod. Moreover, when a base material is not present an aggregate with "excellent mechanical strength" has enough strength to resist beakage when grasped by tweezers, etc. A base material is present in the example below and a common spatula was used to test and evaluate whether or not an aggregate thin film would peel or be damaged when scraped. The aggregate of spherical CSCP nanoparticles of the present invention has characteristics suitable for this sort of test. The aggregate of spherical CSCP nanoparticles of the present invention has not existed until now and has excellent mechanical strength, uniformity, and transparency as well as optical characteristics such as a large refractive index, etc.

Spherical CSCP nanoparticles and a process for producing the same are already publicly known, as well as the formation of a polymer layer comprising an anti-reflection film and a high refractive index metal oxide. However, the previous substance called an aggregate of spherical CSCP nanoparticles comprises self-organized agglomerations of nanoparticles, and it has problems because it is nonuniform, has no mechanical strength, is friable, cannot form a large surface area film, and does not transmit light. In contrast, the aggregate of spherical CSCP nanoparticles of the present invention has a uniform distribution of spherical CSCP nanoparticles, contains a fixing agent comprising a resin, has excellent mechanical strength, enables easy fabrication of a large surface area film, has excellent light transmittance and UV light-blocking properties, and in particular, has superb characteristics for use as an anti-reflection material for a display. Therefore, it has properties that differ substantially from the prior art aggregate of spherical CSCP nanoparticles.

The present invention provides the following advantageous effects.

(1) It can produce and provide an aggregate of spherical core-shell cerium oxide/polymer hybrid nanoparticles (spherical CSCP nanoparticles).

(2) It can provide an aggregate of spherical CSCP nanoparticles that has a high concentration of spherical CSCP nanoparticles at a volume fraction of 32% or higher, contains a fixing agent, is uniformly distributed, has excellent mechanical strength, enables easy fabrication of a large surface area film, and has excellent light transmittance and UV light-blocking properties.

(3) The cerium oxide constituting the aggregate of spherical CSCP nanoparticles has a high refractive index, and a high refractive index layer that is preferably used in an anti-reflection agent can be fabricated therefrom by dispersing the spherical CSCP nanoparticle aggregate in a photosetting resin (photosensitive resin) or a thermosetting resin and then curing the resin.

(4) It can provide a large surface area coating or film of anti-reflection material that has the above high refractive index layer.

(5) The above high refractive index layer is transparent and uniform, and it can be used as an anti-reflection material in a display because of its UV light absorption characteristics.

(6) The above aggregate of spherical CSCP nanoparticles can be used for a photonic crystal, and it can provide a high performance optical device.

(7) A UV light-blocking film can be fabricated and provided therefrom because cerium oxide has excellent UV light-blocking properties.

BEST MODE FOR CARRYING OUT THE INVENTION

Figure 1:
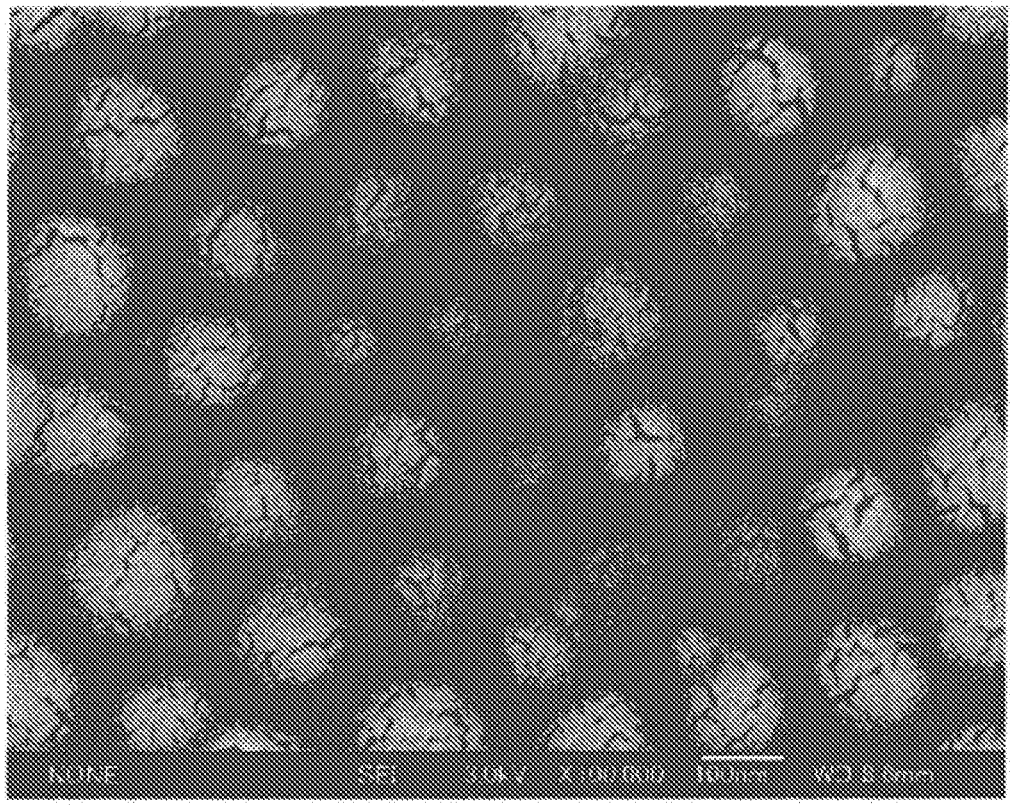
FIG. 1 illustrates the microstructure of Sample 1-3 (Example 1) observed by SEM.

The present invention is next described in detail based on examples, but the present invention is by no means limited to the following examples.

Example 1

1) Synthesis of Spherical CSCP Nanoparticles

In the present example, first the spherical CSCP nanoparticles were synthesized. Ethylene glycol (EG), polyvinylpyrrolidone (PVP), and cerium nitrate hexahydrate were used as the starting materials and mixed together to prepare a mixed starting material liquid. The concentrations of PVP and cerium nitrate hexahydrate in relation to EG were 120 kg/m$^3$ and 0.6 kmol/m$^3$, respectively.

The catalogue value for the mean molecular weight of PVP was 10,000. The above mixed starting material liquid was heated and refluxed at a given temperature for a given duration using a CC200 organic synthesis apparatus (Sibata Scientific Technology, Ltd.). The temperature setting was 165° C. and once this temperature was reached the heating and reflux time was 120 minutes. The mixed starting material liquid became clouded during the heating and reflux step. After heating and reflux at the given temperature the cloudy liquid was cooled rapidly. The cloudy liquid was then centrifuged at 18,000 rpm and washed with water and ethanol to remove the unreacted materials and the excess polymer. After washing, the solution was dried at 80° C. to obtain a powder. This powder was used as the spherical CSCP nanoparticles.

2) Preparation of Ink Containing Spherical CSCP Nanoparticle Powder and Photosetting Resin Next the above spherical CSCP nanoparticle powder was mixed with a photosetting resin and a solvent to prepare an ink. Pentaerythritol triacrylate (PETA, NK Ester A-TMM-3LM-N, Shin-Nakamura Chemical Co., Ltd., 57% triester content) was used as the photosetting resin monomer, and Irgacure 184 (Ciba Specialty Chemicals, 1-hydroxycyclohexyl phenyl ketone) was used as the polymerization initiator. The weight ratio of the PETA photosetting resin monomer to the Irgacure 184 photosetting resin polymerization initiator was 100:5. A mixed solvent of methyl ethyl ketone (MEK) and isophorone was used as the solvent. The volume ratio of MEK to isophorone was 90:10.

After mixing spherical CSCP nanoparticle powder, photosetting resin, and solvent, the combined weight of the spherical CSCP nanoparticle powder and photosetting resin (consisting of PETA and Irgacure 184) contained in the ink was 0.1 g per 1 mL of ink. Moreover, the weight ratio of the spherical CSCP nanoparticle powder to PETA to Irgacure 184 was 40:20:1.

Using the resulting ink, an aggregate was then formed on a base material with a bar coater. A microscope slide and Si/SiO$_2$ were used as the base materials for Sample 1-1 (Lot. 1020-2) and Sample 1-2 (Lot. 1020-4), respectively. The aggregate was irradiated with UV light using a high pressure mercury-vapor lamp to obtain the final samples.

The ink for producing Sample 1-3 was prepared in exactly the same way as in the above method except that a mixed solvent of methyl isobutyl ketone (MIBK) and isophorone was used. The volume ratio of MIBK to isophorone was 95:5.

A cellulose triacetate (TAC) film was used as the base material for Sample 1-3 (Lot. 1114-6), which was prepared with the above method and conditions. The surface of the TAC film was not cleaned with ethanol before coating. Various characteristics of the resulting samples are summarized in Table 1. The comparative samples described below are also listed in this table.

TABLE 1

| Sample No. | Lot. No. | Spatula Scratch Test | Microstructure (SEM) |
|---|---|---|---|
| Sample 1-1 | 1020-2 | No damage | Uniform particle distribution, resin between particles |
| Sample 1-2 | 1020-4 | No damage | Uniform particle distribution, resin between particles |
| Sample 1-3 | 1114-6 | No damage | Uniform particle distribution, resin between particles (FIG. 1) |
| Comparative Sample 1-1 | 902-5 | No damage | Non-uniform particle distribution (FIG. 4) |
| Comparative Sample 1-2 | 902-6 | No damage | Non-uniform particle distribution |
| Comparative Sample 1-3 | 116-1 | No damage | Non-uniform particle distribution |
| Comparative Sample 1-4 | 116-4 | Damaged | No resin between particles |
| Comparative Sample 1-5 | 1104-1 | No damage | |
| Comparative Sample 1-6 | 1114-3 | Damaged | Uniform particle distribution, resin between particles |

Figure 2:
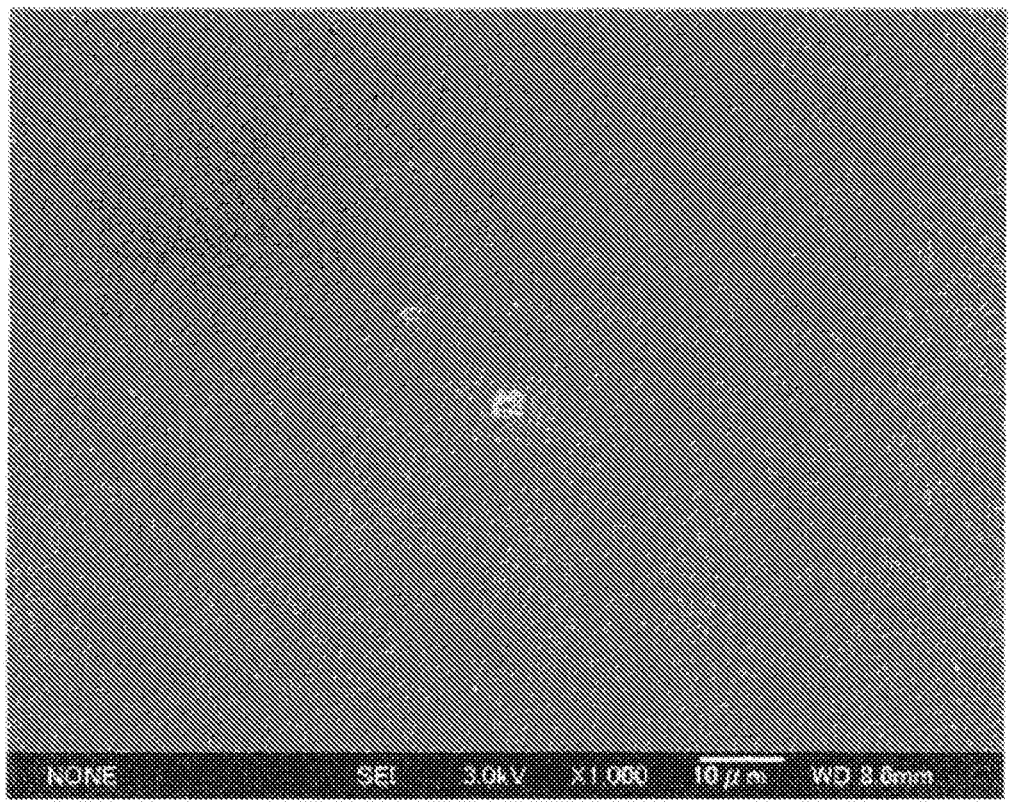
FIG. 2 illustrates the microstructure of Sample 1-3 (Example 1) observed by SEM (lower magnification); the light-colored area in the center of the figure changed in color when observed under higher magnification.

Samples 1-1 to 1-3 were not damaged in the spatula scratch test and were found to have excellent mechanical strength. Moreover, an investigation of the microstructures thereof by SEM observation confirmed that there was resin between the spherical CSCP nanoparticles, and that no voids were present. FIG. 1 shows the microstructure of Sample 1-3 (Example 1) observed by SEM. Moreover, FIG. 2 shows the microstructure of Sample 1-3 (Example 1) observed by SEM (low magnification). In these figures the particle distribution is uniform with no maldistribution (FIGS. 1 and 2). The light-colored area in the center of FIG. 2 changed color in the SEM under high magnification. This was attributed to a change in the resin caused by the electron beam.

Figure 3:
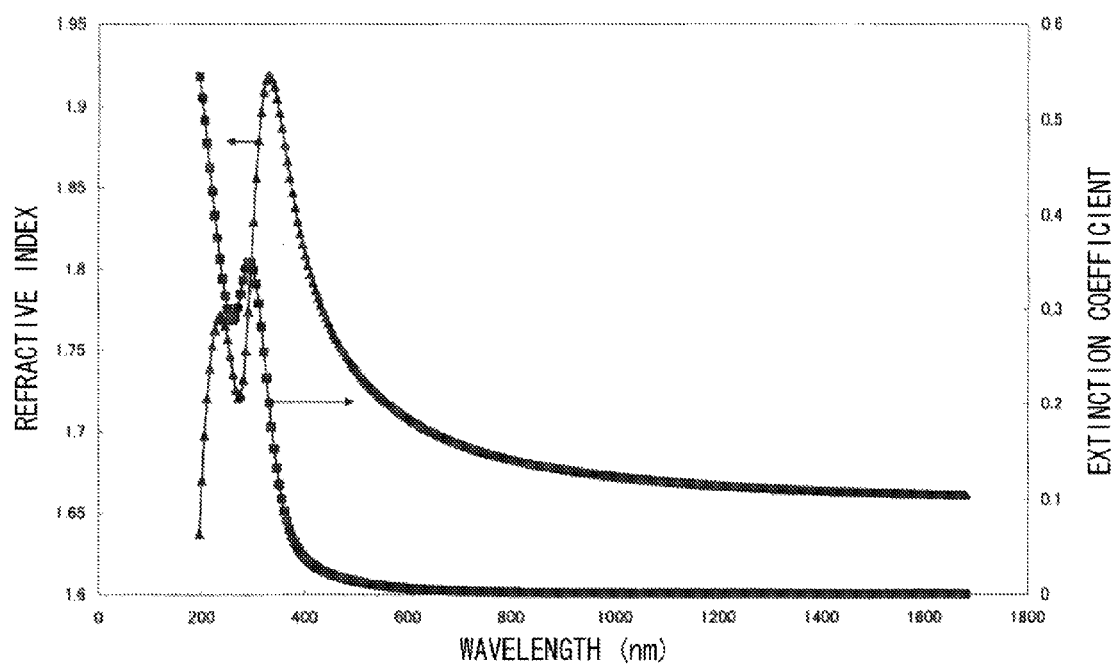
FIG. 3 illustrates the relationship between the wavelength and refractive index of the high refractive index layer in Sample 1-3 (Example 1) as well as the relationship between wavelength and extinction coefficient therefor, as evaluated with spectroscopic ellipsometry.

The optical characteristics (refractive index and haze value) of Sample 1-3 were investigated. The refractive index was evaluated with spectroscopic ellipsometry. FIG. 3 shows the relationship between the wavelength and refractive index of the high refractive index layer in Sample 1-3 (Example 1) as well as the relationship between wavelength and extinction coefficient. The results reveal that on the base material there was a 461 nm layer (FIG. 3) with a refractive index of 1.720 (wavelength 550 nm), and on top of that a 54 nm layer with a refractive index of 1.548 (wavelength 550 nm).

The present example enabled easy formation of a high refractive index layer and a low refractive index layer on a base material. The mean refractive index of the aggregate was 1.702. The haze value was evaluated with a haze meter. The haze value was 1.65% (corrected by subtracting the haze value of the base material from the haze value for the base material plus the aggregate).

The volume fraction of the aggregate occupied by spherical CSCP nanoparticles in Sample 1-3 was 40% or higher and was determined by calculation. The volume fraction was calculated using densities of 7.28 g/cm$^3$, 1.26 g/cm$^3$, and 1.41 g/cm$^3$ for the core (cerium oxide), shell (polymer), and the cured resin after the photosetting resin was irradiated with light, respectively.

It should be noted that the volume fraction of the spherical CSCP nanoparticles in the layer with a refractive index of 1.720 was estimated to be 73.8% from the refractive index. Here the volume fraction was calculated using refractive indices of 2.1, 1.52, and 1.53 for the core (cerium oxide), shell (polymer), and the cured resin after the photosetting resin was irradiated with light, respectively.

Comparative Example 1

Comparative Samples 1-1 to 1-6 will next be described for comparison with the present invention. The comparative samples were produced under essentially the same conditions as in Example 1, and the differences between the Comparative Example and Example 1 are listed below.

Figure 4:
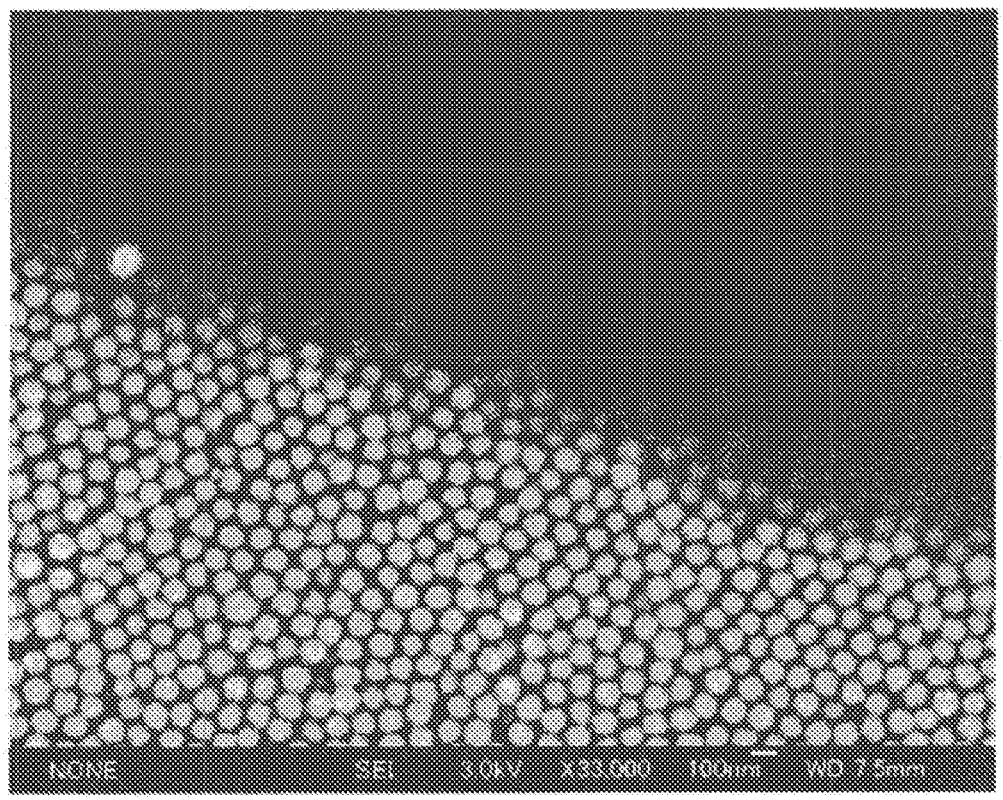
FIG. 4 illustrates the microstructure of Comparative Sample 1-1.

Comparative Sample 1-1 (Lot. 902-5)—Solvent: ethanol, Aggregate Formation Method: ink dripping only, Base Material: microscope slide Comparative Sample 1-2 (Lot. 902-6)—Solvent: ethanol, Aggregate Formation Method: ink dripping only, Base Material: Si/SiO$_2$
Comparative Sample 1-3 (Lot. 116-1)—Solvent: propylene glycol monomethyl ether, Base Material: polyethylene terephthalate (PET) film
Comparative Sample 1-4 (Lot. 116-4)—Solvent: ethylene glycol monobutyl ether, Base Material: TAC film
Comparative Sample 1-5 (Lot. 1104-1)—Solvent: ethanol, No spherical CSCP nanoparticles, Base Material: TAC film
Comparative Sample 1-6 (Lot. 1114-3)—Base Material: TAC film, surface cleaned with ethanol before coating Ethanol, propylene glycol monomethyl ether, and ethylene glycol monobutyl ether were used as the solvents for Comparative Samples 1-1 to 1-4. FIG. 4 illustrates the microstructure of Comparative Sample 1-1. As can be seen in the figure, there are problems both in the nonuniformity of the microstructure (FIG. 4), and also in mechanical strength. In the upper right part of FIG. 4 there is only resin, and in the lower left there is an area densely populated by spherical CSCP nanoparticles. Therefore, the spherical CSCP nanoparticles in Comparative Sample 1-1 are not uniformly distributed.

In Comparative Sample 1-5, ethanol was used as the solvent and an ink containing no spherical CSCP nanoparticles was used. A film was formed in this case. Therefore, ethanol is preferred when the ink contains no spherical CSCP nanoparticles, but if the ink does contain spherical CSCP nanoparticles, a problem will occur because they will not be uniformly distributed.

In prior art documents, for example, Japanese Patent Application Laid-open No. 2006-256310 discloses that ethanol is used as the solvent in the examples, and paragraph [0097] of Japanese Patent Application Laid-open No. 2003-27003 states that ethanol is preferred as the solvent. Therefore, it is clear that ethanol is a common solvent and normally is not considered a particularly special solvent.

However, even though ethanol is a typical solvent, it cannot always be used with the spherical CSCP nanoparticles, so in use of the spherical CSCP nanoparticles, the type of solvent is not arbitrary and a preferred solvent must be specially selected. This is a new discovery by the inventors relevant to spherical CSCP nanoparticles, and the present invention has further expanded the scope of prior art spherical CSCP nanoparticles by using this discovery.

If the TAC film base material is cleaned with ethanol, a problem with mechanical strength occurs, and a problem also occurs in the microstructure of the aggregate because there is no resin between the particles even though the particle distribution is uniform. Therefore, the compatibility of spherical CSCP nanoparticles and ethanol can be considered extremely poor.

Example 2

In the present example, first spherical CSCP nanoparticles were synthesized as in Example 1 above. Next the spherical CSCP nanoparticle powder was mixed with a photosetting resin and a solvent to prepare an ink. The photosetting resin monomer and polymerization initiator were the same as in Example 1. The weight ratio of the PETA photosetting resin monomer to the Irgacure 184 photosetting resin polymerization initiator was also 100:5 as in Example 1. A mixed solvent of MIBK and isophorone was used as the solvent. The volume ratio of MIBK to isophorone was 95:5.

After mixing the spherical CSCP nanoparticle powder, photosetting resin, and solvent, the combined weight of the spherical CSCP nanoparticle powder and photosetting resin (consisting of PETA and Irgacure 184) contained in the ink was 0.1 g per 1 mL of ink. Moreover, the weight ratio of the spherical CSCP nanoparticle powder to PETA to Irgacure 184 was 40:20:1.

Using the resulting ink, an aggregate was then formed on a base material with a bar coater. A PET film was used as the base material. The aggregate was irradiated with UV light using a high pressure mercury-vapor lamp to obtain the final samples. It should also be noted that the surface of the PET film was not cleaned with ethanol before coating. The resulting aggregate was Sample 2-1 (Lot. 1216-4).

Sample 2-1 was not damaged in the spatula scratch test and was found to have excellent mechanical strength. Moreover, an investigation of the microstructures by SEM confirmed that resin was present between the spherical CSCP nanoparticles and that no voids were present. Moreover, the particle distribution was uniform with no maldistribution.

The refractive index was evaluated with spectroscopic ellipsometry. The results showed that on the base material there was a 158.6 nm layer with a refractive index of 1.686 (wavelength 550 nm), and on top of that there was a 35.6 nm layer with a refractive index of 1.576 (wavelength 550 nm wavelength), a 122.6 nm layer with a refractive index of 1.698 (wavelength 550 nm wavelength), and a 42.5 nm layer with a refractive index of 1.529 (wavelength 550 nm).

The mean refractive index of the all of the layers was 1.661. The haze value was evaluated with a haze meter. The haze value was 0.77% (corrected by subtracting the haze value of the base material from the value for the base material plus the aggregate). As in Sample 1-3 in Example 1, it was calculated that the volume fraction of the aggregate occupied by spherical CSCP nanoparticles was 40% or higher.

Example 3

In the present example, first spherical CSCP nanoparticles were synthesized as in Example 1 above. Next the shells of the spherical CSCP nanoparticles were reduced with a 4 hour heat treatment in air at 200° C. The calcined spherical CSCP nanoparticle powder was mixed with a photosetting resin and a solvent to prepare an ink. The photosetting resin monomer and polymerization initiator were the same as in Example 1.

The weight ratio of the PETA photosetting resin monomer to the Irgacure 184 photosetting resin polymerization initiator was also 100:5 as in Example 1. A mixed solvent of MIBK and 3-methoxy-3-methyl-1-butanol was used as the solvent. The volume ratio of MIBK to 3-methoxy-3-methyl-1-butanol was 80:20.

After mixing the calcined spherical CSCP nanoparticle powder, photosetting resin, and solvent, the combined weight of the spherical CSCP nanoparticle powder and photosetting resin (consisting of PETA and Irgacure 184) contained in the ink was 0.05 g per 1 mL of ink. Moreover, the weight ratio of the spherical CSCP nanoparticle powder to PETA to Irgacure 184 was 40:20:1

Using the resulting ink, an aggregate was then formed on a base material with a bar coater. A TAC film was used as the base material. The aggregate was irradiated with UV light using a high pressure mercury-vapor lamp to obtain the final samples. It should be noted that the surface of the TAC film was not cleaned with ethanol before coating. The resulting aggregate was Sample 3-1 (Lot. 612-3).

Sample 3-1 was not damaged in the spatula scratch test and was found to have excellent mechanical strength. Moreover, an investigation of the microstructures by SEM confirmed that there was resin between the spherical CSCP nanoparticles and that no voids were present. Moreover, the particle distribution was uniform with no maldistribution.

Example 4

The aggregate in the present example was prepared under the same conditions as Example 3 except for the weight ratio of the spherical CSCP nanoparticle powder, PETA, and Irgacure 184. The weight ratio of the spherical CSCP nanoparticle powder to PETA to Irgacure 184 was 60:20:1. The resulting aggregate was Sample 4-1 (Lot. 615-2).

Sample 4-1 was not damaged in the spatula scratch test and was found to have excellent mechanical strength. Moreover, an investigation of the microstructures by SEM confirmed that there was resin between the spherical CSCP nanoparticles and that no voids were present. Moreover, the particle distribution was uniform with no maldistribution.

The refractive index was evaluated with spectroscopic ellipsometry. The results showed that on the base material there was a 75 nm layer with a refractive index of 1.834 (wavelength 550 nm), and on top of that a 61 nm layer with a refractive index of 1.565 (wavelength 550 nm).

The volume fraction of the spherical CSCP nanoparticles with a refractive index of over 1.8 was estimated to be 72% or higher from the refractive index after calcination. Here the volume fraction was calculated with refractive indices of 2.1, 1.52, and 1.53 for the core (cerium oxide), shell (polymer), and the cured resin after the photosetting resin was irradiated with light, respectively. Therefore, it was possible to produce an aggregate with an extremely high concentration of CSCP nanoparticles through the aggregation of the spherical CSCP nanoparticles.

Example 5

In the present example, first spherical CSCP nanoparticles were synthesized as in Example 1 above. However, the catalogue value for the mean molecular weight of PVP was 55,000 and the heating and reflux time was changed to 100 minutes. The particle diameter of the resulting spherical CSCP nanoparticles was approximately 60 nm.

A calcining treatment (heat treatment) as in Example 3 was applied to the resulting spherical CSCP nanoparticle powder. Next the calcined spherical CSCP nanoparticle powder was mixed with a photosetting resin and a solvent to prepare an ink. Dipentaerythritol hexaacrylate (DPHA) was used for the photosetting resin monomer. The polymerization initiator was Irgacure 184 as in the preceding examples. The weight ratio of the DPHA photosetting resin monomer to the Irgacure 184 photosetting resin polymerization initiator was 100:5 just as in the preceding examples. The same solvent from Example 3 was also used.

After mixing the calcined spherical CSCP nanoparticle powder, photosetting resin, and solvent, the combined weight of the spherical CSCP nanoparticle powder and the photosetting resin contained in the ink was 0.046 g per 1 mL of ink. Moreover, the weight ratio of the spherical CSCP nanoparticle powder to DPHA to Irgacure 184 was 40:20:1.

Using the resulting ink, an aggregate was then formed on a base material with a bar coater. A TAC film was used as the base material. The aggregate was irradiated with UV light using a high pressure mercury-vapor lamp to obtain the final samples. It should be noted that the surface of the TAC film was not cleaned with ethanol before coating. The resulting aggregate was Sample 5-1 (Lot. 9825-1).

The refractive index was evaluated with spectroscopic ellipsometry and was calculated to be about 1.733 assuming a single layer model. Moreover, Sample 5-1 was not damaged in the spatula scratch test and was found to have excellent mechanical strength. In addition, an investigation of the microstructures by SEM confirmed that there was resin between the spherical CSCP nanoparticles and that no voids were present. Moreover, the particle distribution was uniform with no maldistribution.

INDUSTRIAL APPLICABILITY

As described in detail above, the present invention relates to an aggregate of spherical core-shell cerium oxide/polymer hybrid nanoparticles and provides an aggregate of spherical CSCP nanoparticles that has a high concentration of spherical CSCP nanoparticles at a volume fraction of 32% or higher, contains a fixing agent, has a uniform distribution of the spherical CSCP nanoparticles, and has excellent mechanical strength. The cerium oxide in the aggregate of spherical core-shell cerium oxide/polymer hybrid nanoparticles of the present invention has a high refractive index and is expected to be applicable to a variety of uses because it has a variety of characteristics such as UV light absorption, etc. For example, it can be applied to a UV light-blocking film or to a high refractive index layer used in an anti-reflection material that is used in a display, etc., due to its absorption of UV light. Films wherein cerium oxide is dispersed in a resin have a high refractive index because cerium oxide itself has a high refractive index of 2.1, and a high refractive index layer can be produced at a low cost with the present invention. The present invention provides a new aggregate of spherical CSCP nanoparticles, a process for producing the same, and an anti-reflection material, etc., having a high refractive index layer.

The invention claimed is:

1. An aggregate of cerium oxide/polymer nanoparticles for an optical device having a high refractive index,
    the cerium oxide/polymer nanoparticles are spherical core-shell cerium oxide/polymer hybrid nanoparticles having a spherical secondary particle formed by assembled cerium oxide primary particles having a size range of 2 nm to 3 nm serving as the core and a crosslinked polymer serving as the shell, wherein
    1) the aggregate is highly concentrated, with a volume fraction of the spherical core-shell cerium oxide/polymer hybrid nanoparticles being at least 32%;
    2) the aggregate contains a fixing agent made from a resin;
    3) the aggregate is configured such that the fixing agent fills in voids between the spherical core-shell cerium oxide/polymer hybrid nanoparticles;
    4) the aggregate has a uniform distribution of the spherical core-shell cerium oxide/polymer hybrid nanoparticles; and
    5) the aggregate has the mechanical strength resistant to destruction by scraping with a metal rod and no silane coupling agent or surfactant is present on a surface of the core of the spherical core-shell cerium oxide/polymer hybrid nanoparticles.

2. The aggregate of cerium oxide/polymer nanoparticles according to claim 1, wherein the fixing agent is a photosetting resin or a thermosetting resin that has been cured by irradiation with light or application of heat.

3. The aggregate of cerium oxide/polymer nanoparticles according to claim 1, wherein the aggregate has a film-like structure formed as a coating on a substrate or base material.

4. The aggregate of cerium oxide/polymer nanoparticles according to claim 1, wherein a refractive index thereof is no lower than 1.65.

5. The aggregate of cerium oxide/polymer nanoparticles according to claim 1, wherein a haze thereof is no higher than 2%.

6. An anti-reflection film characterized by comprising an aggregate of spherical core-shell cerium oxide/polymer hybrid nanoparticles defined in claim 1.

7. An ink for fabricating an aggregate of spherical core-shell cerium oxide/polymer hybrid nanoparticles defined in claim 1,
wherein the ink is formed from core-shell cerium oxide/polymer hybrid nanoparticles, a photosetting resin, and a solvent.

8. A process for producing an aggregate of spherical core-shell cerium oxide/polymer hybrid nanoparticles defined in claim 1, wherein the process comprises
a step of preparing an ink formed from core-shell cerium oxide/polymer hybrid nanoparticles, a photosetting resin or a thermosetting resin, and a solvent;
a step of forming the ink into a compact; and
a step of curing the resulting compact by irradiation with light or application of heat.

9. The process for producing the aggregate of spherical core-shell cerium oxide/polymer hybrid nanoparticles according to claim 8, wherein the solvent is methyl ethyl ketone, methyl isobutyl ketone, methyl lactate, ethyl lactate, or butyl lactate.

* * * * *